Jan. 19, 1937.　　　　　　　E. WHITE　　　　　　　2,067,997
FUEL INJECTOR FOR INTERNAL COMBUSTION ENGINES
Filed May 7, 1934　　　　　　3 Sheets-Sheet 1

INVENTOR
ELI WHITE
BY
ATTORNEY

Jan. 19, 1937. E. WHITE 2,067,997
FUEL INJECTOR FOR INTERNAL COMBUSTION ENGINES
Filed May 7, 1934 3 Sheets-Sheet 2

INVENTOR
ELI WHITE
BY
ATTORNEY

Jan. 19, 1937.  E. WHITE  2,067,997
FUEL INJECTOR FOR INTERNAL COMBUSTION ENGINES
Filed May 7, 1934  3 Sheets-Sheet 3

INVENTOR
Eli White
BY
ATTORNEY

Patented Jan. 19, 1937

2,067,997

UNITED STATES PATENT OFFICE 2,067,997

FUEL INJECTOR FOR INTERNAL COMBUSTION ENGINES

Eli White, Detroit, Mich.

Application May 7, 1934, Serial No. 724,281

9 Claims. (Cl. 123—139)

This invention relates to fuel injectors for internal combustion engines of the Diesel type wherein fuel in liquid form is discharged under pressure directly into the cylinder, and the object of the invention is to provide an injector including a valve and an atomizing element operable to cause injection and atomization of the fuel under pressure developed in the cylinder by the compression stroke of the piston.

One of the features of the invention resides in the provision of an injector, valve and atomizer in a single compact unit secured in the head of the cylinder, the moving parts of which are automatically operable by pressure within the cylinder to cause an injection of the fuel under the necessary pressure.

It is further a feature and object of the invention to provide a target having a mushroom like surface located preferably on the center line of the cylinder, which surface is roughened to a degree sufficient to cause the breaking up of the oil stream discharging thereagainst into fine particles and, due to the shape of the target, to distribute the oil stream radially from the center of the cylinder at the upper end thereof.

It is also an object of the invention to provide a metal target, preferably of a high heat resistant material, on the center line of the combustion cylinder and having a surface which is heated by the combustion of fuel in the cylinder to a temperature higher than that produced by the compression stroke whereby the particles in striking the surface of the target will be immediately vaporized through heat to practically a combustion temperature.

It is further a feature and object of this invention to provide a ram operable by the pressure within the engine cylinder and adapted to increase the pressure upon the fuel charge to above that in the cylinder thereby injecting the fuel against the increased cylinder pressure.

It is also a feature and object of this invention to provide for a variable stroke of the fuel plunger operable by the cylinder pressure and secure a longer stroke thereof and corresponding increase in the quantity of fuel injected under increased pressures in the combustion cylinder.

An additional object of the invention is to provide an adjustable means by which the pressure in the combustion cylinder determines the point of time when the injection of fuel begins.

It is further a feature and object of the invention to provide a means to create turbulence in the air of the cylinder as it meets the inrushing fuel streams at the instant the fuel comes in contact with the heated target.

It is further an object and feature of the invention to provide a sliding sleeve in association with a fuel plunger to open and close the fuel delivery passages in proper relation with the piston stroke to prevent subjecting the oil supply orifices to suction during the suction stroke of the fuel plunger, the sleeve further having the function of tending to clear the oil discharge orifice of foreign matter that might accumulate therein.

It is further an object of the invention to provide a fuel injecting device wherein both the amount and the timing of the fuel injection by the fuel plunger is regulated through use of a spring-loaded by-pass needle valve to limit the maximum injection pressure of the fuel.

A further feature and object of the invention resides in the provision of a safety valve whereby, as pressure in the combustion cylinder increases beyond a predetermined value, the by-pass needle valve will be automatically opened to prevent further injection of fuel during the existence of excessive pressure in the combustion cylinder.

It is also a feature and object of the invention to provide, in a fuel injection device, means whereby when the engine exceeds a predetermined speed of operation, the injection of fuel into the combustion chamber will automatically cease.

These and various other objects and novel features of construction of a device embodying my invention are hereinafter more fully described and claimed, and the preferred forms of a fuel injection device embodying my invention are shown in the accompanying drawings in which—

Figure 1:
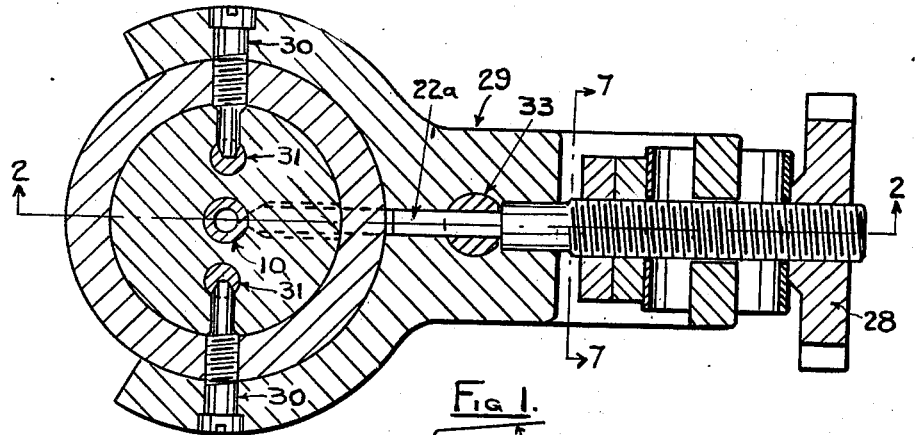
Fig. 1 is a cross section of the preferred form of my improved fuel injection device taken on line 1—1 of Fig. 2.

The fuel injector is to be understood as being a complete assembled unit adapted for introduction into the head of an engine cylinder, a portion of which is indicated at 13, it is here shown in threaded relation therewith but the injector body may form the entire head of the cylinder and be bolted to the flange of the combustion chamber.

The device consists of a hollow body member 12 having a longitudinal bore, in one end of which its stationarily secured a block 16. In this block is a fuel cylinder 15 at one end of which is a ball check valve 17 held in position closing the aperture in the inlet end of the fuel cylinder by a spring 18. The inlet end of this fuel cylinder opens to a cross channel 19 opening to a threaded aperture 20 in the wall of the body 12 for connection of a fuel supply pipe. This cross channel 19 connects with a right-angle portion 27 thereof which also opens to a cross channel 27ª opening by an aperture 27ᵇ to the fuel cylinder 15. The channel 27ª is aligned with an opening in the body 12 through which the body of a needle valve 21 passes to engagement with a seat therefor whereby the needle valve 21 may close the aperture 27ᵇ to the fuel cylinder 15.

Figures 2, 3:
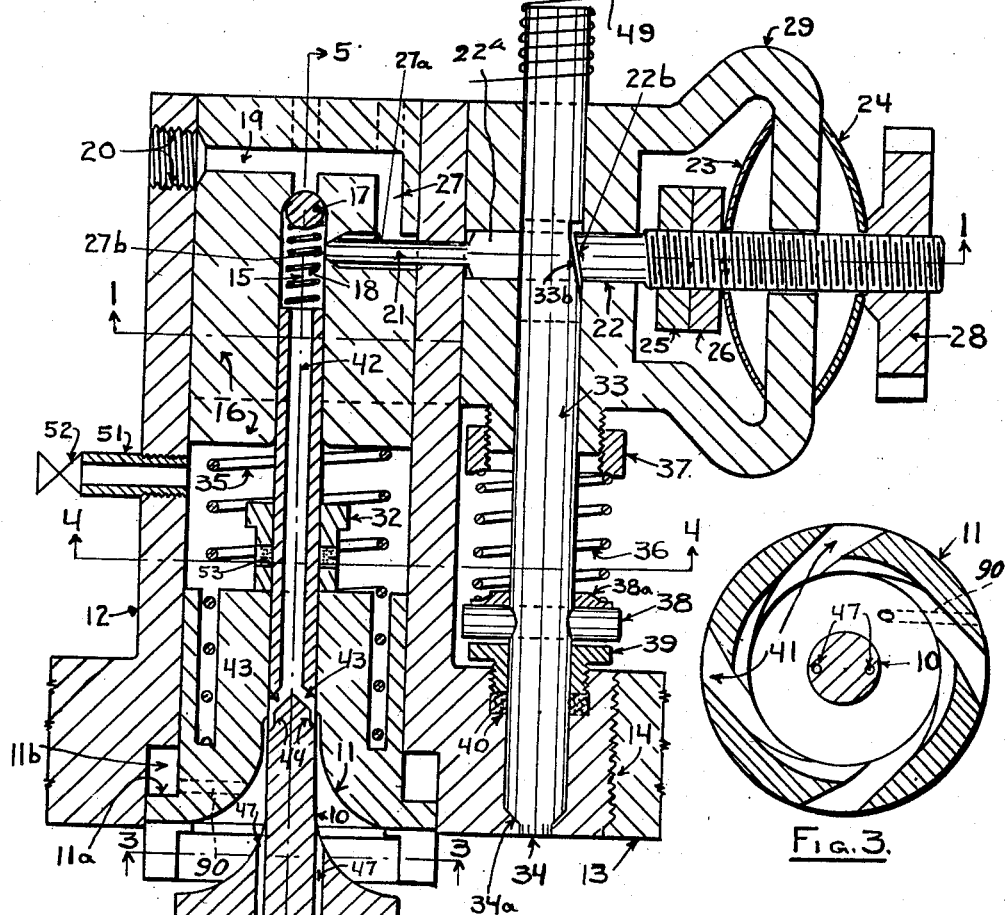
Fig. 2 is a vertical section thereof taken on line 2—2 of Fig. 1.
Fig. 3 is a cross section taken on line 3—3 of Fig. 2 showing particularly the tangential air inlet passages at the inner extremity of the operating sleeve.

The fuel cylinder 15 opens through the lower end of the block 16 in the view shown in Fig. 2 and reciprocable therein is a fuel plunger 10 which is of a tubular form and extending through the bell mouthed sleeve 11. This sleeve is recessed at its upper end to receive coils of a spring 35 which seats at its outer end against the block 16. The spring 35 therefore tends to force the sleeve 11 to the position shown in Fig. 5. The plunger 10 is also there shown in its extended position and on the inner or cylinder end is provided a toroidal shaped head, the outer curved face thereof corresponding in form to the bell mouth shape of the opposed end of the sleeve. The plunger 10 is hollow for a portion of its length, as shown, and is provided toward the inner or cylinder end with apertures 43 opening through the side walls of the plunger and to the bell mouth of the sleeve 11 in the position of the parts shown in Fig. 2.

Figures 5, 6:
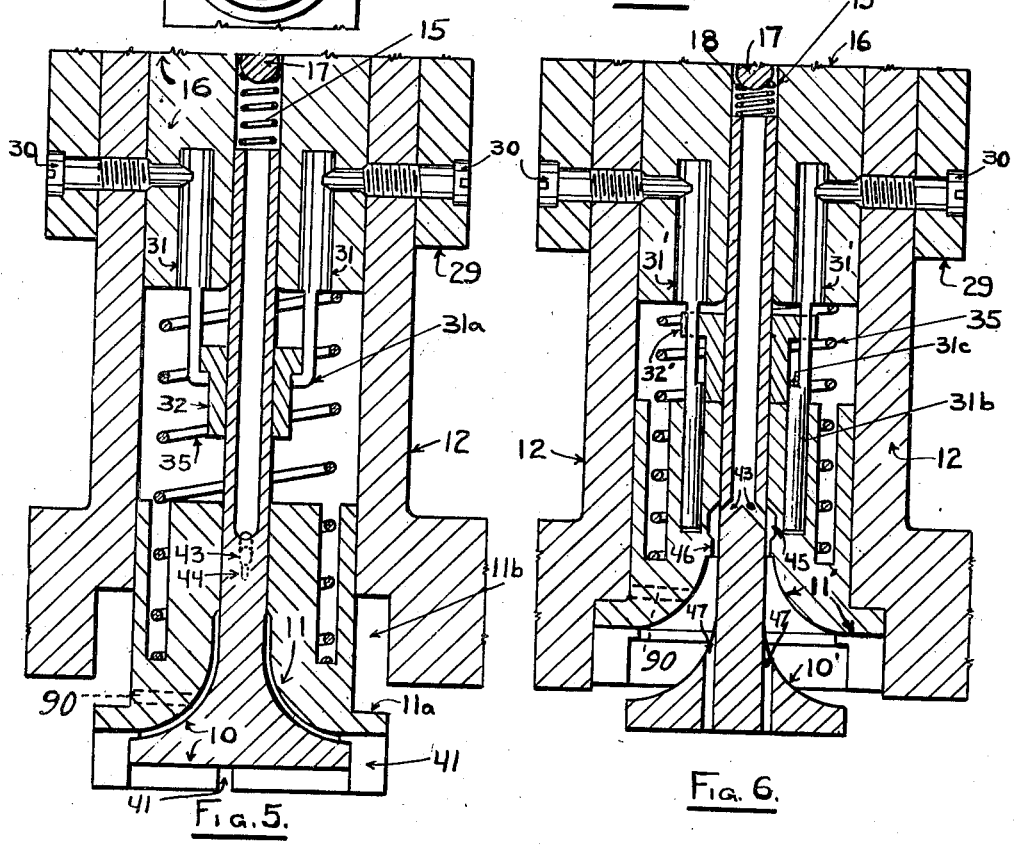
Fig. 5 is a section taken on line 5—5 of Fig. 2 showing the fuel plunger and sleeve in the extended position.
Fig. 6 is a similar longitudinal section showing some alternative forms of parts of the device.

The normal position of these parts is shown in Fig. 5. As the piston (not shown) of the combustion cylinder moves outwardly, air in the cylinder is compressed and this pressure by means of the tangential slots 41 formed in the lower end of the sleeve and shown in section in Fig. 3 is applied to the inner end of the sleeve 11 and forces the sleeve outwardly against the compression of the spring 35 until the sleeve contacts with the collar 32 on the plunger.

In the position of the parts shown in Fig. 5, the orifices 43 and 44 leading from the interior 42 of the plunger are closed by the wall of the sleeve which engages the same and as the mushroom head of the plunger 10 is spaced from but lying within the bell mouthed face of the sleeve the pressure on the plunger is practically equalized on opposite sides thereof. Thus the sleeve first moves under the cylinder pressure uncovering these ports 43 and immediately thereafter engages the collar 32 on the plunger stem forcing the plunger outwardly and compressing liquid in the fuel cylinder 15 beneath the ball 17. This movement of the plunger causes an injection of fuel through the ports 43 and 44. The ejection of this fuel is against the mushroom head of the plunger which has an outwardly curved roughened wall causing the oil particles to be broken up.

As the head of the plunger 10 is cylindrical in form, the fuel is discharged in all directions radially of the cylinder head, the outer end wall of which, as shown in Fig. 2, is practically flush with the inner end of the body 12. It is to be noted, however, that the orifices 44 and passages 43 are closed by the sleeve practically up to the point of compression of the fuel in the fuel cylinder and hollow portion of the plunger through engagement of the upper end of the sleeve 11 with the collar. Now as the sleeve is moved rapidly by the increasing pressure in the combustion chamber due to movement of the piston in the engine cylinder it strikes the collar 32 with a hammer like blow at approximately the instant the orifices 44 open thereby imparting high velocity to the fuel in the initial injection into the cylinder.

The bell mouthed sleeve 11 of Figs. 2 and 5, and 11' of Fig. 6 has a passageway 90 opening at one end to the central bell mouthed portion and at the opposite end opening through the face of the sleeve just at the shoulder 11ª. This provides for discharge of air from the chamber 11ᵇ on the upstroke of the sleeve which is forced through the apertures 11ᶜ into the bell mouth of the sleeve.

The check valve 17 and needle valve 21, shown clearly in Fig. 2, prevent the fuel under normal conditions being forced backwardly into the passages 19 and 27. The fuel is therefore ejected from the chamber 15 and interior of the plunger through the orifices 44 in a fine stream of high velocity into the space between the mouth of the sleeve 11 and correspondingly shaped opposed face of the head of the plunger. It is here met with air which had entered this space from the combustion cylinder during the outward movement of sleeve 11 through tangential slots 41 (see Fig. 3) which imparted a high whirling velocity to the air, thus the oil particles have imparted to them a radial motion from their own velocity and a tangential motion from the air which they meet. The fuel stream as it is ejected also strikes the roughened curved outer face of the head of the plunger which provides a target for the fuel causing the fuel to be thoroughly atomized from this cause as well as from the additional cause that this head of the plunger 10 is heated and the air of the cylinder is also hot. Thus the atomized fuel under the high pressure and the hot conditions mentioned is ignited and passes into the head of the cylinder as a whirling spray of burning gases. During this period of compression of the fuel and ejection thereof and the mixing with the air in the cylinder, the pressure on the sleeve 11 and the plunger 10 has been rapidly increased and when the pressure in the fuel chamber is sufficient to open the by-pass valve 21 against the compression of the springs 23 and 24 the fuel may then pass through the passageway 27ª allowing the plunger 10 to complete its stroke which occurs when the flange 11ª of the sleeve 11 comes in contact with the bottom of the recess 11ᵇ provided therefor thereby causing cessation of further injection of fuel.

As the piston (not shown) in the combustion chamber completes its work stroke under expansion of the fired charge, the pressure in the combustion chamber falls and the spring 35 then forces the sleeve 11 against the head of the plunger 10 carrying it to initial position shown in Fig. 5. Upon initial inward movement of the sleeve 11, the ports 43 are first closed and as the sleeve contacts the head of the plunger the plunger is moved thus tending to produce partial vacuum in the fuel cylinder 15. This reduced pressure causes an opening of the check valve 17 and, as the needle valve closes under such reduced pressure by action of the spring 23, the needle valve is also closed. Thus, on this inward movement of the sleeve and the fuel plunger, the fuel cylinder is again filled. This, of course, leaves the interior of the plunger and the orifices 43 and terminal portions 44 thereof filled with fuel oil ready for a succeeding operation. During the compression stroke of the piston, outward movement of the sleeve 11 is not only resisted by compression of the spring 35 but also by compression of air in the space or chamber between the sleeve 11 and the block 16. This chamber between the sleeve 11 and block 16 is opened by means of a passage 51 and valve diagrammatically indicated at 52 to atmosphere. If the air be wholly released by fully opening the valve 52, the sleeve will strike the collar 32 earlier in the cycle, that is, at less pressure in the combustion cylinder, than is the case if the valve be partially or wholly closed. Thus the timing of the injection of the fuel charge can be varied.

The amount of fuel injected will depend upon the size of the orifices 44, the stroke of the operating sleeve after it reaches the collar 32, and the net pressure of the two springs 23 and 24 which hold the needle valve 21 in closed position. By increasing or decreasing the net pressure of these two springs 23 and 24 the amount of fuel injected into the combustion cylinder can be varied to the requirements of speed or load. It is here pointed out that the springs 23 and 24 are oppositely curved leaf springs and a nicety of adjustment of the spring pressure can be produced by variation of the position of the nuts 28 on the spring 24 and the nut 26 and lock nut 25 on the spring 23. These nuts which are shown round may be operated by spanner wrench for which sockets 48 are provided. The stem of the needle valve is threaded to receive these nuts.

If the pressure in the combustion chamber of the cylinder becomes too high for any reason, means is provided to open the needle valve 21 and thereby prevent further injection of oil into the cylinder. This is accomplished by means of the safety plunger 33 which is reciprocably mounted in a head 29 in which the body 12 is supported and which also supports the needle valve structure. As shown in Figs. 1 and 2, the needle valve has a flattened portion 22ª passing through a slot in the safety plunger 33 and the stem 22 of the valve 21 on the opposite side of the plunger from the valve is provided with an inclined surface 22ᵇ engaging a similarly sloping surface 33ᵇ on the plunger as shown particularly in Fig. 2.

The safety plunger extends through the head 29 and into the base of the body 12 inserted in the cylinder head to engagement with a seat 34ª and closing the aperture 34 opening to the cylinder. The plunger 33 has a cross pin 38 on which seats a washer 38a having a seat for the end of the spring 36. The plunger 33 is introduced through a packing nut 39. The spring 36 holds the plunger 33 seated and closing the aperture 34 and the compression of the spring may be adjusted by the nut 37. On excess pressure arising in the cylinder, this safety plunger 33 will be raised which, due to the inclined surface of the plunger 33ᵇ engaging the inclined surface 22ᵇ on the needle valve, raises the needle valve 21 from its seat thereby causing the plunger to cease to function in respect to injection of oil into the cylinder. This arrangement of needle valve and safety plunger may be utilized to prevent the engine exceeding certain speed for which purpose a solenoid 49 may be utilized on the plunger 33 energizable at certain engine speed to lift the plunger and thus open the needle valve 21. The energizing means for the solenoid is not here shown as the circuit therefor is a circuit commonly known to electrical engineers.

The head or frame 29 may be secured to the body 12 as by means of the screws 30 and these screws at the inner ends also engage the arms 31 inserted in apertures provided therefor in the block 16 as shown in Fig. 5. These arms have their inner ends 31ª beneath the flange provided on the collar 32 as shown in Fig. 5 and as the collar is attached to the plunger 10, these arms limit the movement of the plunger inwardly of the cylinder on its suction stroke.

Figure 4:
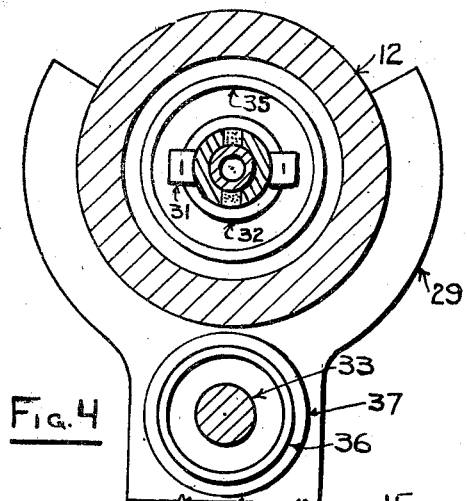
Fig. 4 is a section taken on line 4—4 of Fig. 2.
Figure 7:
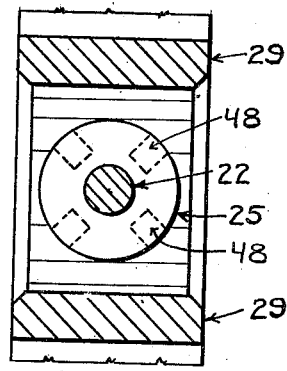
Fig. 7 is a section taken on line 7—7 of Fig. 1.

A slightly different form of holder for the collar is shown in Fig. 6 at 31' and the flange on the collar 32' of Fig. 4 is notched at its periphery and the body portion 31ª of the holder 31' on which the collar is slidable lie in the opposed notches. The lower ends 31ᵇ of the holder are of greater width than the body portions 31ª providing a shoulder 31ᶜ against which the flange of the collar seats when the plunger is in its extreme inward position. These ends 31ᵇ ride in recesses provided in the sleeve 11' which otherwise is of the same character of construction as the sleeve 11 shown in Fig. 5. The function of these parts, however, is the same in either case in respect to the handling of the fuel charge. The sleeve 11' however is held from rotative movement by the ends 31ᵇ of the holder elements 31'. The collar in all cases may be welded to the plunger by welds indicated at 53 in Fig. 2 or otherwise secured thereto as may be desired.

The operating sleeve being forced inwardly of the cylinder by the spring 35, it will be evident that the compression of this spring together with the variation of pressure in the chamber in which the spring is located will determine the degree of pressure in the combustion cylinder at which injection of fuel by the fuel plunger will begin as has previously been stated. It is also to be noted that the passages 47 in the mushroom shaped head of the fuel plunger open through the head from the side thereof against which the fuel is discharged and communicate directly to the cylinder.

Thus while the fuel charge in the main is distributed radially, some fuel is injected centrally of the cylinder and by this means a practically uniform fuel mixture is provided in the combustion chamber as the oil is injected through the central opening 42 of the fuel plunger and discharging through the apertures 43 into the throat of the sleeve has portions thereof discharged in a radial direction from the center of the cylinder and a portion thereof directly to the center of the cylinder.

In Fig. 6 I have shown a slightly different form of the wall of the sleeve 11' in which the fuel plunger 10' is reciprocable. In this arrangement of Fig. 6, the cylindrical wall of the aperture in which the fuel plunger reciprocates is recessed as at 45 to which the fuel is discharged from the apertures 43 and then this fuel passes through the orifices 46 in the sleeve 11' and thence is distributed as in the structure shown in Fig. 2 in which the fuel plunger itself is recessed at 44 and the oil passes through the apertures 43 and thence through recesses 44 into the mouth of the sleeve.

In recapitulation and in order that the operation of the device may be made more clear, it is to be observed that, when pressure in the combustion chamber is low, the fuel plunger 10 and the sleeve will occupy the position shown in Fig. 5. When the pressure in the combustion chamber increases to a degree sufficient to overcome the compression of the spring 35 it will force the sleeve upwardly as shown in Fig. 2 at which point the upper end of the sleeve engages the collar 32 on the plunger. Thereupon further movement of the sleeve due to increasing pressure forces the plunger upward against the fuel in the fuel cylinder 15 and the tubular channel 42 of the plunger. The pressure on the fuel closes the check valve 17 and forces the fuel through the fuel plunger and apertures 43 therein in either of the forms shown and thence out through the passages 44 of Figs. 2 and 5 or through the recesses 45 and orifices 46 of the form shown in Fig. 6. The fuel therefore is discharged at high velocity against the upper curved and roughened surface of the outer face of the head of the fuel plunger. Due to the curved shape of this head, a radial motion is imparted to the fuel particles and at the same time they meet a body of air rotating rapidly because of the whirling motion given to it by tangential passageways 41; this gives a tangential component to the fuel particles causing them to travel toward the outer wall of the cylinder in curved lines, thereby providing a turbulence which adds to the efficiency of the combustion. Due to the fact that the mushroom head, or target as it has been termed, on the fuel plunger is highly heated, as is also the case with the face of the sleeve open to the combustion chamber, the fuel is both atomized and vaporized as it enters the combustion chamber.

There are several advantages in use of the sliding sleeve 11. It delays the injection of fuel until the pressure of the combustion chamber overcomes the compression of the spring 35 and entrapped air if the valve 52 is closed or partially closed. A hammer like blow is produced between the sleeve and the collar 32 thereby causing a high injection velocity of the fuel. A slow velocity of injection of fuel at the beginning of its injection would result in a poor atomization. Also this arrangement, due to the hammer like blow on the fuel plunger, maintains the orifice 43 and 44 of Fig. 2 or 43, 45, and 46 of Fig. 6 clear of dirt or obstruction.

Also on its inward motion the sleeve closes the orifice therein and in the plunger respectively so that oil cannot be drawn out of the plunger on its suction stroke which is produced by the spring 35 moving the sleeve and the plunger from the position shown in Fig. 6 to the position shown in Fig. 5.

Figure 8:
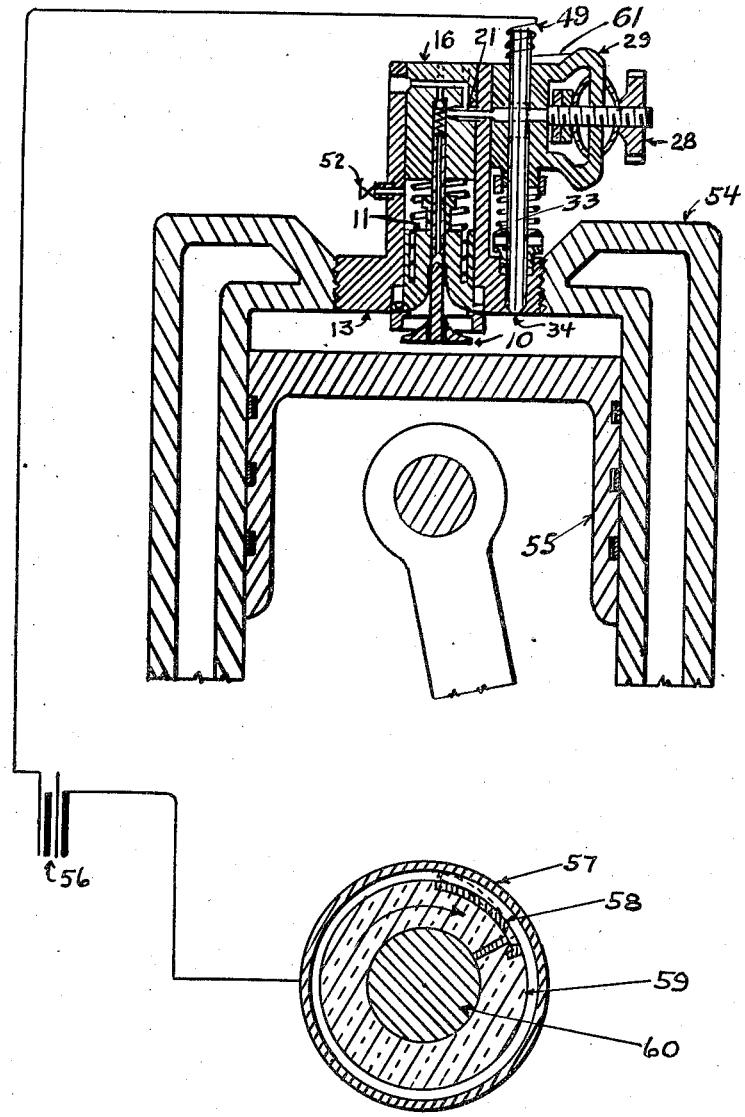
Fig. 8 is a vertical section of my improved fuel injector mounted in the outer end of an engine cylinder and showing the electric circuit for controlling the same.

In Fig. 8 I have shown the injector as attached to the outer end of the cylinder wall 54 in which cylinder the piston 55 reciprocates. The plunger 33 is actuated by means of a solenoid 49 and this solenoid is connected with a source of electric current indicated at 56 and the circuit is grounded at one end to the injector casing as indicated at 61 and at the other end is grounded to a metallic sleeve 57. In the sleeve 57 is an insulating sleeve 59 on the crank shaft 60 of the engine. The insulating member carries a contact element 58 which is metallically connected to the crank shaft 60.

As the engine speed increases, the free end of the contact element 58 is moved outwardly by centrifugal force as indicated by dotted lines to contact with the sleeve 57 to which one end of the circuit is connected. As the other end of the circuit 61 is grounded to the engine this will complete the circuit through the crank shaft 60 and energizes the solenoid 49 lifting the plunger 33 unseating the plunger 21 permitting fuel in the chamber 15 to be injected into the channel 27. This will cause cessation of injection of the fuel into the engine cylinder until the speed of the crank shaft is reduced to a point where the contact plate 58 falls back out of contact with the sleeve 57. Thus the plunger 33 functions to control engine speed as above stated and also may function to cause cessation of injection of fuel in the event the pressure in the combustion chamber is too high as has been heretofore stated.

It will be observed from the foregoing that there are several advantages secured by my improved fuel injector. It is constructed in a single assembled and compact unit involving the function of the fuel pump, valve, atomizer, fuel heater and speed and safety control and that through the heating and fine atomization of the fuel due to the hot roughened surface of the head of the fuel plunger against which the fuel is discharged, an immediate and practically perfect combustion is secured.

The structure provides a means of distributing the fuel from the center of the cylinder toward the periphery thereof as well as centrally of the cylinder and also contains a simple means of securing turbulence in the air at the instant the fuel is injected thereby increasing the speed of combustion. By the adjustment of the pressure with which the needle valve 21 is seated, the pressure at which the fuel will by-pass through the channel 27 may be increased for heavy loads when a larger quantity of fuel is required at higher injection pressure than is the case when the engine is running under less load and requiring a less quantity of oil. It also provides a means for regulating the maximum pressure at which fuel may be injected as well as the pressure at which the injection begins and also provides for prevention of unsafe pressures in the combustion chamber as well as unsafe speeds of the engine.

The drawings and description have been confined to practically one form with some slight variation in some of the parts but it will be evident that various changes in structure may be made without departing from the spirit of the invention as set forth in the appended claims.

Having thus fully described my invention, its utility and mode of operation, what I claim and desire to secure by Letters Patent of the United States is—

1. In a liquid fuel injection device for internal combustion engines, a body having a fuel cylinder open to a fuel inlet, a check valve between one end of the cylinder and the inlet, a plunger reciprocable in the fuel cylinder, movement thereof in one direction drawing fuel into the cylinder, said plunger further having a passageway and ejection ports for discharge of fuel whereby movement in the other direction causes pressure to develop in the fuel cylinder closing the check valve and ejecting the fuel from the plunger, a spring-pressed member reciprocably mounted on the plunger and positioned in respect to the engine cylinder whereby pressure within the cylinder moves the member against the compression of its spring, means on the plunger engaged by the spring pressed member on its movement away from the engine cylinder to force the plunger on its pressure stroke, means in conjunction with the said spring pressed member for holding the ejection ports of the plunger closed until the sleeve is moved to position to engage said means on the plunger, and a head on the plunger directly subject to the heat in the engine cylinder providing a target having a face directed toward the sleeve against which the fuel stream is ejected, the face of the target directed toward the sleeve being bell-shaped in outline causing the fuel striking thereagainst to be discharged radially and approximately at a right angle to the axis of the cylinder.

2. In a device for injecting liquid fuel into the compression space of a cylinder of an internal combustion engine, a body having a central bore, a plunger therein, a fuel cylinder in the body at one end thereof in communication with a fuel supply passage, a check valve between an end of the cylinder and the supply passage, the body also having a bore of greater diameter than the fuel cylinder and opening to the cylinder of the engine, a sleeve in the bore reciprocably mounted on the plunger, a spring between the sleeve and the body portion in which the fuel cylinder is located, means limiting the movement of the plunger inwardly of the cylinder, a head on the plunger engaged by the sleeve under its spring pressure to move the plunger to its inward limit of movement, a valve controlled conduit connecting the space formed between the sleeve and the said portion of the body containing the fuel cylinder whereby, through variation in the valve opening, a greater or less pressure of air occurs therein thereby variably restricting movement of the sleeve by pressure in the engine cylinder, means on the plunger engaged by the sleeve for moving the same outwardly in respect to the engine cylinder, the plunger having a conduit for oil and having openings to within the body of the sleeve in slidable contact therewith when the sleeve is at its inward position under the spring pressure, a by-pass for the fuel cylinder opening to the supply passage, a needle valve closing the by-pass, means for varying the pressure with which the needle valve is seated, and means associated with the valve and movable by a predeterminable pressure within the engine cylinder to open the valve and by-pass the said fuel and prevent injection of fuel under abnormally high pressure conditions in the engine cylinder.

3. In a liquid fuel injection device for internal combustion engines, a body attachable to the engine cylinder having a face thereof forming a part of the wall of the combustion chamber, the body having a bore of large diameter opening to the engine cylinder and a bore of lesser diameter providing a fuel cylinder adjacent the opposite end of the body, a plunger reciprocable in the fuel cylinder, a passageway through which fuel is injected into the engine cylinder on outward movement of the plunger, a spring-pressed sleeve in the bore of larger diameter and normally moving the plunger inwardly of the engine cylinder to draw oil into the fuel cylinder, the sleeve being movable by pressure within the engine cylinder, means for varying the resistance to movement of the sleeve by the pressure within the engine cylinder, means on the plunger engaged by the sleeve to move it on its stroke to eject oil into the cylinder, a head on the plunger directly subject to the heat of the engine cylinder to cause vaporization of the fuel striking thereagainst, said head having a shape on the face thereof against which the fuel is ejected to cause the fuel to tend to discharge radially into the engine cylinder at substantially a right angle to its longitudinal axis, there being apertures extending through the head and parallel with the axis of the plunger through which a portion of the fuel may be injected axially of the center of the cylinder.

4. In a liquid fuel injection device for internal combustion engines, a body attachable to the engine cylinder having a face thereof forming a part of the wall of the combustion chamber, the body having a bore of large diameter at one end opening to the engine cylinder and a bore of lesser diameter providing a fuel cylinder adjacent the opposite end of the body, a plunger reciprocable in the fuel cylinder, a passageway through which fuel is injected into the engine cylinder on outward movement of the plunger, a spring-pressed sleeve in the bore of larger diameter and normally moving the plunger inwardly of the engine cylinder to draw oil into the fuel cylinder, the sleeve being movable by pressure within the engine cylinder, means for varying the resistance to movement of the sleeve by the pressure within the engine cylinder, means on the plunger engaged by the sleeve to move it on its stroke to eject oil into the cylinder, a head on the plunger directly subject to the heat of the engine cylinder to cause vaporization of the fuel striking thereagainst, said head having a shape on the face thereof against which the fuel is injected to cause the fuel to tend to discharge radially into the engine cylinder, and means controlled by the pressure within the engine cylinder to predeterminably limit the pressure under which the fuel is injected into the cylinder.

5. A fuel injector for internal combustion engines comprising a chambered body attachable to the engine cylinder and having a large cylindrical bore, the axis of which coincides with the extended axis of the engine cylinder and opening thereto at one end, a fixed fuel cylinder of smaller bore axially located in the opposite end of the said body, a fuel inlet opening to the fuel cylinder, a spring-actuated ball check valve for closing the said inlet opening through pressure in the fuel cylinder, a fuel piston reciprocable in the fuel cylinder at one end and extending into the engine cylinder at the other end, the said other end having a toroidal shaped head, the curved surface of which is roughened and positioned to be continuously exposed to the gases of combustion in the engine cylinder, there being apertures in said head parallel with the axis of the piston opening through the curved surface at the inner end and through the opposite side of the head, a sleeve reciprocable on the fuel piston having a toroidal surface corresponding in form to the toroidal surface of the head of the fuel piston, a spring tending to move the said sleeve toward the head, means providing for a minimum spacing between the toroidal surfaces of the sleeve and the head, said sleeve having a cylindrical flange like end fitting over the head in its minimum spaced relation, there being tangential passageways opening through the periphery of the said flange like end of the sleeve to the engine cylinder, a collar rigidly secured to the piston and engaged by the sleeve on movement outwardly from the engine cylinder due to pressure within the engine cylinder to thereby cause injection of fuel, said piston having a longitudinal fuel passageway opening at its inner end through the surface of the piston, the sleeve normally closing said openings and opening the same by outward movement just prior to engagement with the collar to thereby cause the discharge of fuel against the toroidal surface of the sleeve and to project onto the toroidal surface of the piston head, means engaging the collar to limit movement of the fuel piston in a direction inwardly of the engine cylinder, a bypass connected with the fuel inlet and opening into the fuel cylinder between said check valve and piston, a spring-actuated needle valve controlling the opening of the bypass to the fuel cylinder, a spring-pressed plunger parallel with the fuel piston, one end of said chambered body having an opening to the engine cylinder to receive the plunger, a seat in said opening, the end of the plunger toward the cylinder being shaped to engage the seat, a spring on the said plunger normally holding said plunger end in engagement with the seat, said end of the plunger being subject to pressure within the engine cylinder, and means on the said bypass needle valve engageable by cooperative means on the said plunger to open the bypass upon movement of the plunger outwardly from the cylinder due to excess pressure in the engine cylinder.

6. A fuel injection device for internal combustion engines comprising in a single unit attachable to the head of the cylinder, a chambered body having a large cylindrical bore opening therethrough to the engine cylinder at one end, a shouldered enlargement in the bore adjacent the cylinder end of the body, a fixed fuel cylinder of smaller bore axially located in the opposite end of the body, a fuel inlet opening to the fuel cylinder, a spring-actuated ball check valve normally closing the said inlet to the fuel cylinder, a fuel piston reciprocable in the cylinder and extending to the engine cylinder, the engine end of the fuel piston having a head bell shaped in form, the outer surfaces of which are continuously exposed to the gases of combustion in the engine cylinder, a sleeve reciprocable on the fuel piston and having a bell mouthed opening corresponding in form to the bell shaped surface of the said head, means for maintaining a normal minimum clearance between the bell shaped face of the head and of the sleeve, a spring tending to move the sleeve inwardly of the engine cylinder to its normal position and minimum clearance with the bell shaped end of the fuel piston, a cylindrical flange on the engine end of the said sleeve engageable with said shouldered enlargement of the bore to limit the movement of the sleeve outwardly in respect to the engine cylinder, means on the fuel piston engaged by the sleeve on its outward movement through pressure in the engine cylinder to project the fuel piston into the fuel cylinder, said piston having a fuel passage a part of its length and having ports leading from the fuel passage to the exterior of the piston, the sleeve normally closing the said ports and by outward movement through pressure in the engine cylinder opening the ports at the time the sleeve engages said means on the piston, and means limiting the movement of the piston and sleeve toward the engine cylinder under influence of the sleeve spring.

7. A fuel injection device for internal combustion engines comprising in a single unit attachable to the head of the cylinder, a chambered body having a large cylindrical bore opening therethrough to the engine cylinder at one end, a shouldered enlargement in the bore adjacent the cylinder end of the body, a fixed fuel cylinder of smaller bore axially located in the opposite end of the body, a fuel inlet opening to the fuel cylinder, a spring-actuated ball check valve normally closing the said inlet to the fuel cylinder, a fuel piston reciprocable in the cylinder and extending to the engine cylinder, the engine end of the fuel piston having a head bell shaped in form, the outer surfaces of which are continuously exposed to the gases of combustion in the engine cylinder, a sleeve reciprocable on the fuel piston and having a bell mouthed opening corresponding in form to the bell shaped surface of the said head, means for maintaining a normal minimum clearance between the bell shaped face of the head and of the sleeve, a spring tending to move the sleeve inwardly of the engine cylinder to its normal position and minimum clearance with the bell shaped end of the fuel piston, a cylindrical flange on the engine end of the said sleeve engageable with said shouldered enlargement of the bore to limit the movement of the sleeve outwardly in respect to the engine cylinder, means on the fuel piston engaged by the sleeve on its outward movement through pressure in the engine cylinder to project the fuel piston into the fuel cylinder, the piston having a longitudinal passageway opening to the fuel cylinder at the one end and terminating a distance from the head, there being ports opening from the said inner end of the fuel passageway to the exterior of the fuel piston, the sleeve normally closing the said ports and by outward movement through pressure in the engine cylinder opening the ports at the time the sleeve engages said means on the fuel piston to thereby cause discharge of fluid by impact, the discharged fluid striking the curved face of the piston head to be distributed radially of the engine cylinder, a bypass in the said inlet opening to the fuel cylinder beneath the spring-pressed check valve, a spring-pressed bypass needle valve engaging the opening of the bypass to the fuel cylinder whereby, on excess pressure in the fuel cylinder, the said spring-pressed needle valve is opened to permit discharge of fuel to the inlet, and means for varying the pressure on the bypass needle valve.

8. A fuel injection device for an internal combustion engine comprising a fixed fuel cylinder, a fuel inlet discharging thereto, a check valve for closing said inlet to the cylinder on excess pressure therein, a fuel piston reciprocable in the fuel cylinder, there being a longitudinal passageway in the fuel piston and a number of radial passages opening from the said longitudinal passageway to the periphery of the piston at a distance from the end opposite the fuel cylinder, a sleeve slidable on the fuel piston by pressure developed in the engine cylinder, a spring opposing said movement and tending to move the sleeve in the opposite direction, the said sleeve opening the radial fuel passages on movement by engine pressure and closing the same on movement by the spring, means on the fuel piston engaged by the sleeve on its movement by engine pressure just as the radial passages are opened to force the piston into the fuel cylinder and eject the fuel into the engine.

9. A fuel injecting device for an internal combustion engine comprising in a single unit a hollow body attachable to the engine and opening thereto, a fuel cylinder in the body, a fuel piston reciprocable therein, a fuel inlet for the said fuel cylinder, a bypass conduit extending from the fuel cylinder to the inlet, a needle valve having a stem and closing the by-pass, variable elastic means on the needle valve stem for varying the pressure with which the needle valve is normally seated, a spring controlled plunger having a wedge shaped surface engaging correspondingly wedge shaped surfaces on the needle valve, and electrically controlled means for causing movement of the plunger and by engagement of said wedge shaped surfaces to unseat the needle valve.

ELI WHITE.